(12) United States Patent
Lemchen

(10) Patent No.: US 11,253,340 B2
(45) Date of Patent: Feb. 22, 2022

(54) METHOD OF SELF DETERMINING THE DEGREE OF FIT OF AN ORTHODONTIC ALIGNER BY A PATIENT WITH THE PATIENT'S TEETH

(71) Applicant: Marc Lemchen, New York, NY (US)

(72) Inventor: Marc Lemchen, New York, NY (US)

( * ) Notice: Subject to any disclaimer, the term of this patent is extended or adjusted under 35 U.S.C. 154(b) by 0 days.

(21) Appl. No.: 16/855,868

(22) Filed: Apr. 22, 2020

(65) Prior Publication Data

US 2020/0367994 A1 Nov. 26, 2020

Related U.S. Application Data

(60) Provisional application No. 62/850,462, filed on May 20, 2019.

(51) Int. Cl.
*A61C 7/08* (2006.01)

(52) U.S. Cl.
CPC .......... *A61C 7/08* (2013.01); *A61C 2201/002* (2013.01)

(58) Field of Classification Search
CPC .. A61C 7/02; A61C 7/08; A61C 7/002; A61C 19/04; A61C 19/05; A61C 9/00; A61C 9/0046; A61C 9/004; A61C 2201/002; A61C 2204/007; A61C 19/10; A61C 13/082; A61C 13/0024
USPC ........... 433/6, 24, 27, 29, 36, 55, 70, 71, 83
See application file for complete search history.

(56) References Cited

U.S. PATENT DOCUMENTS

| | | | | |
|---|---|---|---|---|
| 2,993,276 A | * | 7/1961 | Jankelson | A61C 9/00 433/172 |
| 3,028,338 A | * | 4/1962 | Parker, Jr. | G01N 21/91 252/301.19 |
| 3,848,335 A | * | 11/1974 | Bergersen | A61C 7/08 433/6 |
| 3,959,881 A | * | 6/1976 | Kokal, Jr. | A61C 19/05 433/70 |
| 4,198,243 A | * | 4/1980 | Tanaka | C09D 5/00 106/31.03 |
| 4,512,741 A | * | 4/1985 | Mushta | A61C 9/00 433/70 |

(Continued)

OTHER PUBLICATIONS

Werner, Alison, Ten signs of aligner non-compliance, Oct. 11, 2018 (Year: 2018).*

(Continued)

*Primary Examiner* — Ralph A Lewis
(74) *Attorney, Agent, or Firm* — Marcus C. Dawes; Daniel L. Dawes

(57) ABSTRACT

A method of monitoring the degree of fit of an aligner among a series of aligners includes the steps of selecting an aligner in the series of aligners whose fit to a patient's teeth are to be tested to determine its fit with the selected aligner; disposing a nontoxic colored plastic material into the selected aligner; setting the patient's teeth into the selected aligner containing the material; and determining the amount of material disposed onto the interior aligner's surfaces by visual inspection by assessment of the material disposed therein, a good fit being indicated by a minimum of material extruded onto almost all of the interior aligner surfaces and by a light color, and a poor fit being indicated by an excess of material extruded onto one or more locations of the aligner interior surfaces and a dark color.

11 Claims, 3 Drawing Sheets

(56) References Cited

U.S. PATENT DOCUMENTS

| | | | | |
|---|---|---|---|---|
| 5,395,239 | A * | 3/1995 | Komatsu | A61C 19/05 433/68 |
| 6,254,385 | B1 * | 7/2001 | Jung | A61B 5/0088 356/405 |
| 6,386,864 | B1 * | 5/2002 | Kuo | A61C 7/00 433/215 |
| 7,147,466 | B1 * | 12/2006 | Hilliard | A61C 7/08 433/71 |
| 7,905,724 | B2 * | 3/2011 | Kuo | A61C 19/063 433/6 |
| 9,320,576 | B2 * | 4/2016 | Pechersky | A61C 7/08 |
| 2003/0124481 | A1 * | 7/2003 | Zun | A61C 13/082 433/26 |
| 2006/0068353 | A1 * | 3/2006 | Abolfathi | A61C 7/00 433/6 |
| 2008/0299507 | A1 | 4/2008 | Li | |
| 2008/0206700 | A1 * | 8/2008 | Korytov | G16H 50/50 433/2 |
| 2008/0305452 | A1 * | 12/2008 | Sterental | G16H 50/50 433/24 |
| 2009/0191502 | A1 * | 7/2009 | Cao | A61C 7/08 433/24 |
| 2009/0291407 | A1 | 11/2009 | Kuo | |
| 2012/0270173 | A1 * | 10/2012 | Pumphrey | A61C 7/08 433/6 |
| 2016/0135931 | A1 | 5/2016 | Morales et al. | |
| 2019/0029522 | A1 | 1/2019 | Sato et al. | |
| 2019/0102880 | A1 | 4/2019 | Parpara et al. | |

OTHER PUBLICATIONS

Mallika S. Shetty, K. Kamalakanth Shenoy, "Techniques for Evaluating the Fit of Removable and Fixed Prosthesis", International Scholarly Research Notices, vol. 2011, Article ID 348372, 4 pages, 2011. (Year: 2011).*

Sharma, Ashu et al. "History of materials used for recording static and dynamic occlusal contact marks: a literature review." Journal of clinical and experimental dentistry vol. 5,1 e48-53. Feb. 1, 2013, doi:10.4317/jced.50680 (Year: 2013).*

Barbagallo, Laura; Shen, Gang; Jones Allen, Swain, Micheal et al. Novel Pressure Film Approach for Determining the Force Imparted by Clear Removable Thermoplastic Appliances Mar. 2008, Annals of Biomedical Engineering 36(2):335-41 (Year: 2008).*

Sisodia, Siddharth; Agrawal, Deeksha, Relevance of Disclosing Materials in Prosthodontics, Jul. 2017, Guident, vol. 10 Issue 8, p. 20-22. 3p. (Year: 2017).*

Arno Seeboth; Detlef Loetzsch; Ralf Ruhmann, Piezochromic Polymer Materials Displaying Pressure Changes in Bar-Ranges, 2011, American Journal of Materials Science. 2011; 1(2): 139-142 (Year: 2011).*

David R. T. Roberts; Simon J. Holder, Mechanochromic systems for the detection of stress, strain and deformation in polymeric materials, Mar. 18, 2011, Journal of materials Chemistry (Year: 2011).*

Escudero, P., Yeste, J., Pascual-Izarra, C. et al. Color tunable pressure sensors based on polymer nanostructured membranes for optofluidic applications. Sci Rep 9, 3259 (2019) (Year: 2019).*

Loney RW, Knechtel ME. Diagnosing denture problems using pressure-indicating media. J Prosthet Dent. Feb. 2009;101(2):137-41. doi: 10.1016/S0022-3913(09)60009-3. PMID: 19167538. (Year: 2009).*

Seeboth, Arno, Loetzsch, Detlef, Ruhmann, Ralf, Piezochromic Polymer Materials Displaying Pressure Changes in Bar-Ranges, (2011) American Journal of Materials Science p-ISSN: 2162-9382 e-ISSN: 2162-8424 (Year: 2011).*

* cited by examiner

METHOD OF SELF DETERMINING THE DEGREE OF FIT OF AN ORTHODONTIC ALIGNER BY A PATIENT WITH THE PATIENT'S TEETH

RELATED APPLICATIONS

The present application is a non-provisional of U.S. provisional application Ser. No. 62/850,462, filed on May 20, 2019, which is incorporated herein by reference and to which priority is claimed pursuant to 35 USC 119, 120.

BACKGROUND

Field of the Technology

The invention relates to the field of orthodontics and in particular to use of orthodontic aligners, such as exemplified in CPC A61C 9/00, 3/00, 19/04; A61B 1/04, 1/00, 1/32; G06K 9/62; and H04N 7/18.

Description of the Prior Art

The conventional method of how to monitor aligner treatment in the orthodontist's office is simply to visually examine how well or closely the aligner fits with the patient's teeth. The position of the interior aligner surfaces relative to the tooth surfaces of various aligners in a series of aligners is observed by a trained orthodontist to assess progression with a series of aligners. Dental Monitoring SAS located in Paris, France, has devised a holder for a smartphone that allows the patient to scan an image of their teeth and send to the practitioner's office for analysis by artificial intelligence to track progress with aligners.

What is needed is means and method whereby the patient may be able to make him or herself or assist the orthodontist in remotely making an assessment of fit of the aligners.

BRIEF SUMMARY

The illustrated embodiments of the invention are directed to a method of monitoring the degree of fit of an aligner among a series of aligners defining a corresponding series of tooth positions comprising the following steps. Patient does not have to send images of his or her teeth to a practitioner, although that option is always available. Instead, the patient can self-assess visually the degree of fit and or use a color chart as described below. The material disposed into the aligner will appear darker and more opaque where the aligner fit is the poorest, and very light colored and translucent where the fit is better, and not be visible at all where the fit is best.

The method includes the steps of selecting an aligner in the series of aligners whose fit to a patient's teeth are to be tested to determine its fit with the selected aligner; disposing a nontoxic plastic material into the selected aligner; setting the patients teeth into the selected aligner containing the nontoxic plastic material; and determining the amount of material disposed onto the interior aligner's surfaces by visual inspection by assessment of the material disposed therein, a good fit being indicated by a minimum of material extruded onto almost all of the interior aligner surfaces, and a poor fit being indicated by an excess of material extruded onto one or more locations of the aligner interior surfaces.

In the preferred embodiment the step of disposing a nontoxic plastic material into the aligner, the nontoxic plastic material is colored with the intensity of color being proportional to the thickness of the material and the step of determining the amount of material disposed onto the interior aligner's surfaces by visual inspection by assessment of the material disposed therein comprising determining a good fit by a light color of the disposed material and determining a poor fit by a dark color of the disposed material.

The step of determining a good fit by a light color of the disposed material and determining a poor fit by a dark color of the disposed material comprises comparing observed color of the disposed material to a color chart to determine when the color is a light color indicative of a good fit or when the color is a dark color indicative of a poor fit and corresponding intensities of color therebetween corresponding to degrees of fit therebetween.

The step of setting the patient's teeth into the selected aligner containing the nontoxic plastic material comprises improving the fit using cotton rolls or Chewies®.

The method further includes the steps of selecting a next aligner higher in the series of aligners whose fit to a patients teeth are to be tested to determine whether it is appropriate to progress to use of the next aligner in the series; disposing a nontoxic plastic material into the selected next aligner; setting the patient's teeth into the selected next aligner containing the nontoxic plastic material; and determining the amount of material disposed onto the interior next aligners surfaces by visual inspection by assessment of the material disposed therein, a good fit being indicated by a minimum of material extruded onto almost all of the interior aligner surfaces, and a poor fit being indicated by an excess of material extruded onto one or more locations of the next aligner interior surfaces.

The method further includes the step of comparing an assessment of fit between the selected aligner and selected next aligner to determine which is a better fit with the corresponding selected aligner and selected next aligner to determine appropriateness of progressing higher in the series of aligners.

The method further includes the step of making an impression, a photograph or image of the lack of fit between the teeth and the selected aligner and the step of determining the amount of material disposed onto the interior aligners surfaces by visual inspection or assessing a photograph or image of the filled aligner by assessment of the material disposed therein, includes assessing the photograph, image or three dimensional shape of the impression. Taking a photo or image of the material residing in the gaps caused by the poor fit increases the ability to see these areas, measures the degree of poor fitting, and aids the observer or AI in documenting the lack of fit and degree of lack of fit.

The scope of the invention also extends to a composition of matter for monitoring the degree of fit of an aligner among a series of aligners defining a corresponding series of tooth positions comprising a nontoxic colored plastic material for disposition into a selected aligner which is pressure moldable at room temperature to the patient's teeth into the selected aligner and which is removable from the selected aligner from the patient's teeth without substantial adherence to the teeth, the nontoxic colored plastic material being translucent so that the amount of material disposed onto the interior aligner's surfaces indicates by visual inspection of the material disposed therein of the degree of fit of the aligner to the tooth positions, a good fit being indicated by a minimum of material extruded onto almost all of the interior aligner surfaces and by a light color, and a poor fit being indicated by an excess of material extruded onto one or more locations of the aligner interior surfaces and a dark color.

In one embodiment the nontoxic colored plastic material comprises a food stuff with a pudding consistency.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals,

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

A series of aligners are prepared with a corresponding series or progression of tooth positions intended to be orthodontically created by the aligner series. What is disclosed below is a method to monitor in an orthodontist's office or for patient self-monitoring of the aligner fit, and whether if it is appropriate to move to the next aligner in a series.

A nontoxic liquid or viscous material (e.g. a food product that has a color, a colored liquid or a pudding consistency) is poured or injected into a tooth aligner. When the aligner is inserted into the mouth and fitted to the teeth, it visibly shows areas where the teeth are "seating" well into the aligner and areas where it is not "seating" or tracking well. The quality of the fit is indicated by the amount of material present between the teeth and the aligner interior surfaces, which is indicated by the visible intensity or degree of color of the material between the teeth and the aligner.

Figure 1:
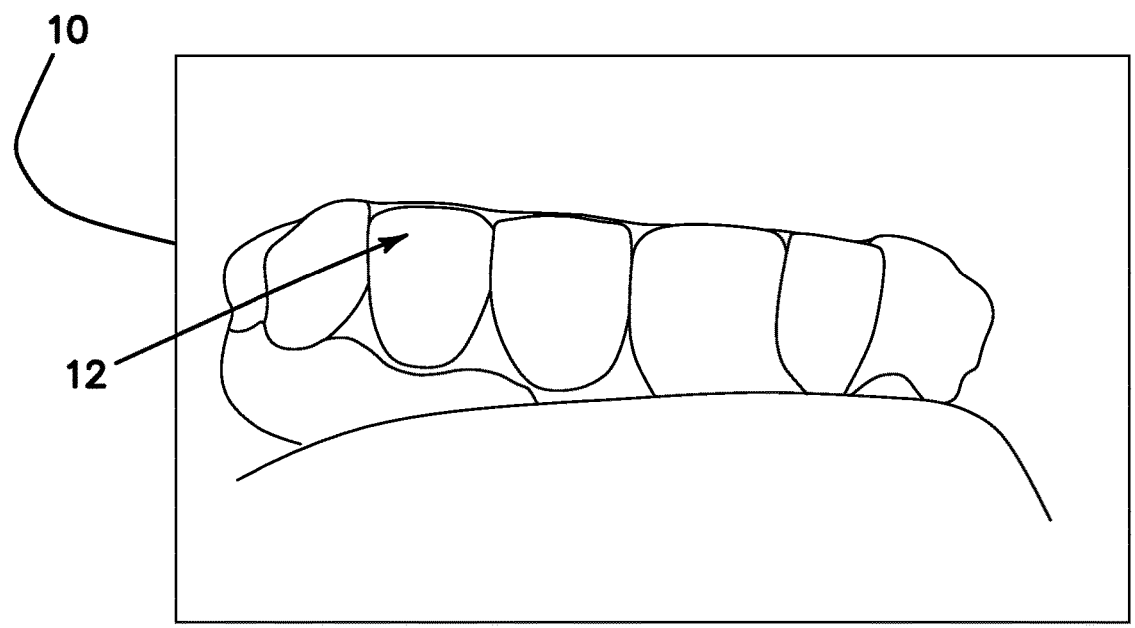
FIG. 1 is a depiction of an aligner set on the lower teeth, which shows virtually no color indicated by the lack of shading in the diagram in any gaps between the aligner and teeth and hence is indicative of an excellent fit to the aligner.

As shown in FIG. 1 an aligner 10 set on the lower teeth 12, which shows virtually no color in any gaps between the aligner 10 and teeth 12 and hence is indicative of an excellent fit to the aligner.

Figure 2:
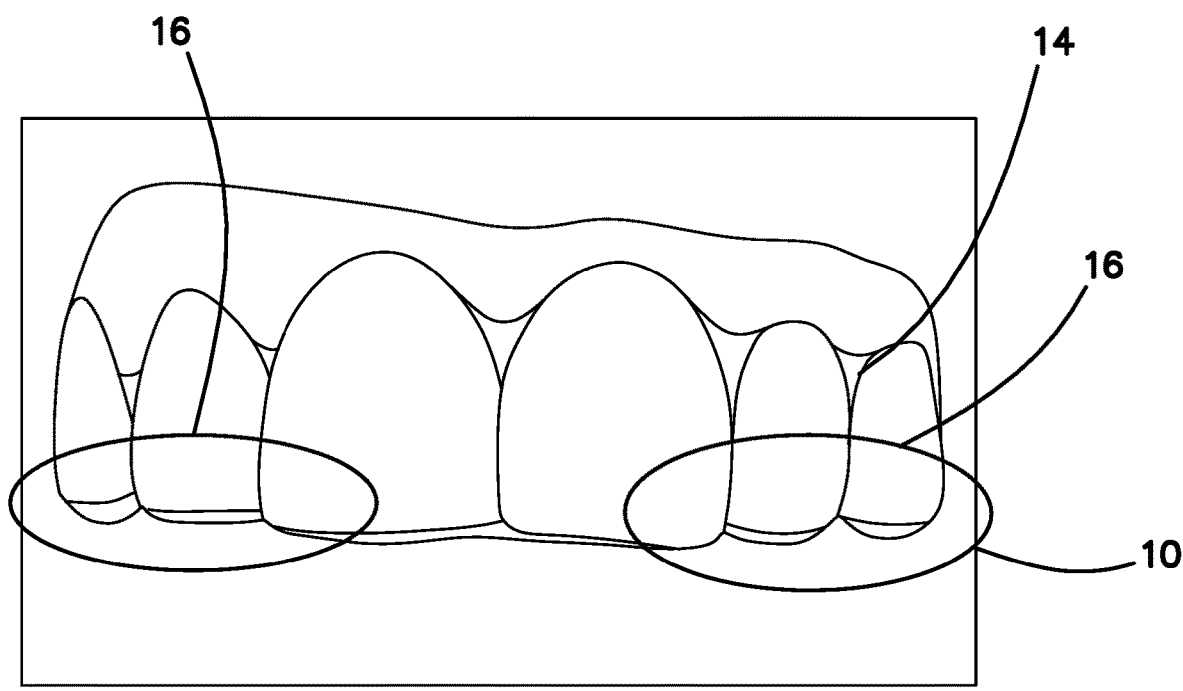
FIG. 2 is a depiction of an aligner set on the upper teeth, which shows only a small amount of color indicated by shading in gaps between the aligner and teeth, which is indicative of a good fit to the aligner.

As shown in FIG. 2 a light color or only a small amount of material is extruded between the tooth surfaces of teeth 14 and the aligner 10 in areas 16, which indicates a good fit and the appropriateness of moving up in the aligner series to the next defined tooth positions. Biting down on cotton rolls or "Chewies"® to apply a distributed force in areas 16 may be used to attempt to adjust or improve the fit of aligner 10 to teeth 14.

Figure 3:
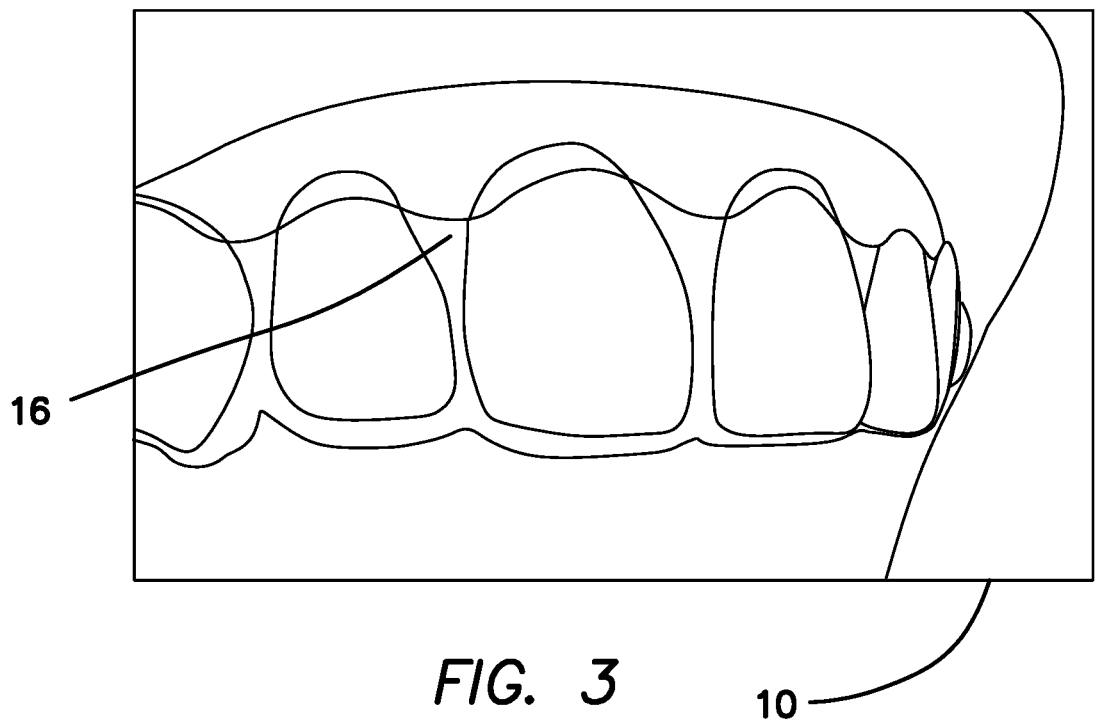
FIG. 3 is a depiction of an aligner set on the upper teeth, which shows an appreciable amount of color indicated by shading in gaps between the aligner and teeth, which is indicative of a poor fit to the aligner.

As shown in FIG. 3 a dark color or a large amount of material allowed or extruded between the surfaces of teeth 14 and the surfaces of aligner 10 indicates a poor fit and the inappropriateness of moving up in the aligner series to the next defined tooth positions. Again the use of cotton rolls or Chewies® to readjust the fit of aligner 10 to teeth 14 is then made. If there is no improvement of fit, then the patient may be urged to report the same to his or her orthodontist's office for consultation and assistance.

Figure 4:
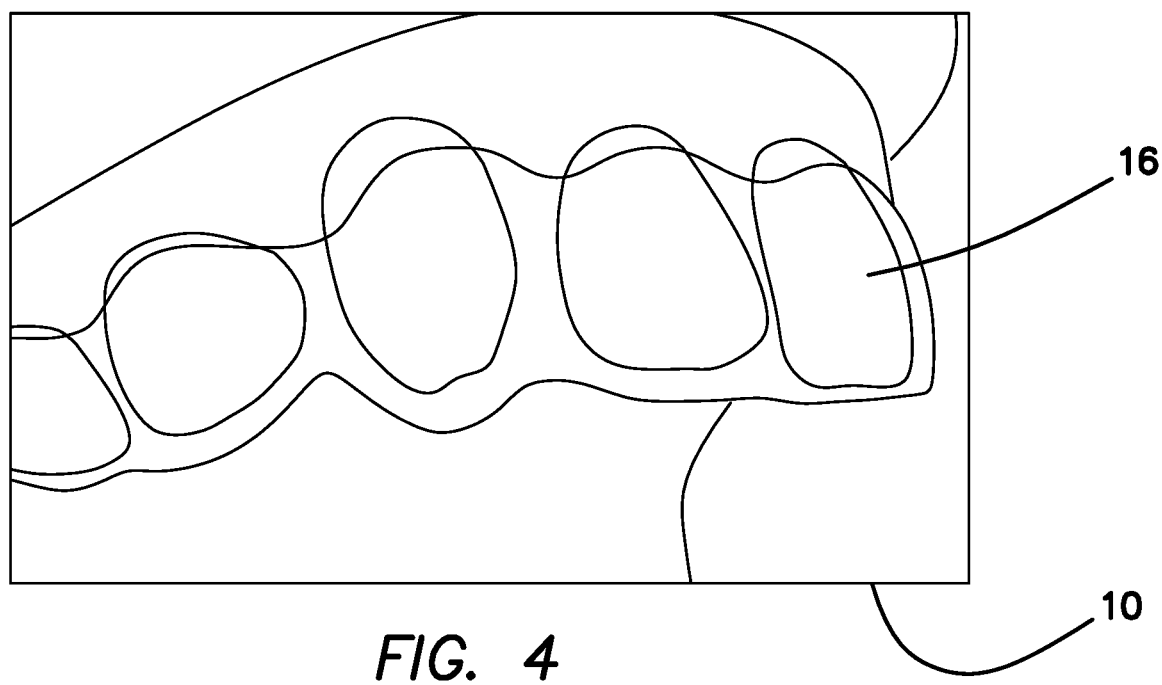
FIG. 4 is a depiction of an aligner set on the upper teeth with the last aligner employed in a series for comparison with the fit shown by the next aligner up in the series.

The depiction of FIG. 3 may, for example, be a step wherein the patient has moved up the series of aligners to test if the next aligner 10 in the series presents a better fit. Thus, in FIG. 4 the patient has inserted the last aligner 10 in the series to determine if a better fit is achieved than seen with the next aligner 10 in the series as shown in FIG. 3. If a return to the last aligner 10 in the series after adjustment using cotton rolls or chewies as shown in FIG. 4 does not indicate a better fit than seen in the fit of the next aligner 10 in the series as shown in FIG. 3, then the patient is directed to his or her orthodontist's office for consultation and assistance.

While the dentist/orthodontist or their staff is trained and experienced in assessing the color differences and locations with respect to aligner fit, it is harder for a patient to assess aligner fit, and the color patterns are also difficult to pick it up in photos, even those taken with specialized self-monitoring imaging systems designed for this purpose, which are now being marketed for the orthodontic market. While at home or in the office, the colored material is placed in an aligner 10, or for example used with every 5th aligner, to see if there is more than a thin line of the material at the edges of the teeth 12, 14. If it is more than in seen in comparison to sample images which are provided to the patient, the patient does not move to the next aligner and devices, such as chewies or cotton rolls, are employed to help seat the aligners better.

The test can be used as often as the patient likes. Just prior to moving up in the series to the next aligner, it is best to determine if they should change to the next aligner or extend the wearing of the present aligner, perhaps using devices, such as chewies or cotton rolls, to help the aligner seat better. Every 5th aligner may be too long of an interval. Most aligners are changed weekly, although most direct-to-consumer or in-house made aligners are worn for two weeks, more if just worn in the evening.

Figure 5:
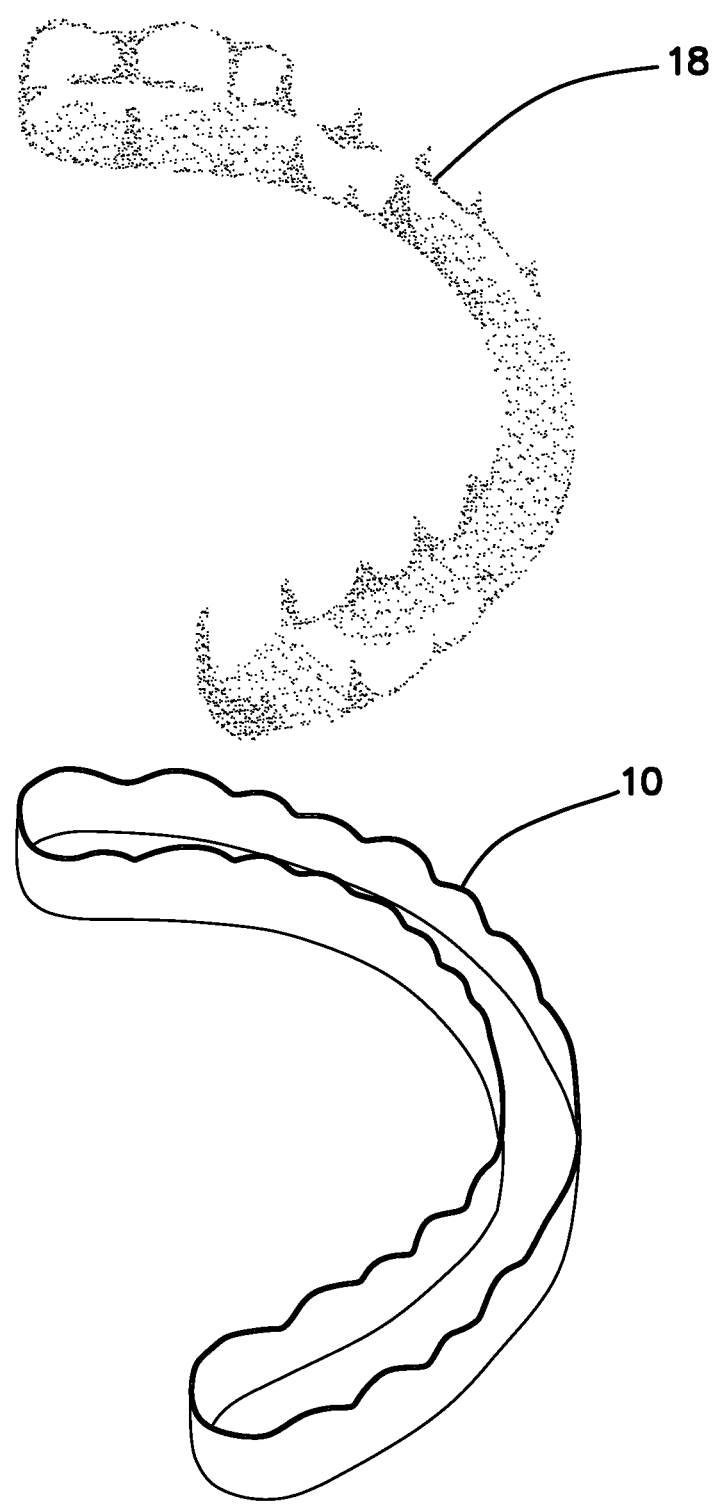
FIG. 5 is a schematic diagram where an impression of the quality of the fit between teeth of a patient and an aligner is made by using the aligner as mold or tray for the impression made between the aligner and teeth.

As diagrammatically shown in FIG. 5 nontoxic material could also be similar to that used for making dental impressions. The patient seats the aligner 10 on the teeth, takes a "selfie" of their teeth, and checks the fit. The impression 18 of the degree of fit can then just be pulled out of the tray or aligner 10 as a three dimensional impression 18 of the degree of misalignment or lack of fit, since it has no adhesive properties. Some material may get stuck between spaces in the teeth, this would have to be removed by the patient or staff if in the office with a brush or pick. The patient, if self-monitoring may take a picture of the impression 18 showing the degree and locations of misfit with aligner 10 after it is removed to send to the treating practitioner to assess how well the aligner is fitting, assuming that a good intact impression 18 is formed and does not get stuck to the teeth.

The patient may also evaluate the fit with comparison to a color chart (not shown). The chart could be used at, for example, the edge of the front teeth 12, 14. If the material is "thick", indicating a poor fit, the color would be darker as defined by the color chart, as compared to where the material is "thinned out" where the tray or aligner is fitting well, where the material's color would be lighter, more transparent or translucent as defined by the color chart. The patient is then able to rate the fit themselves more precisely based on assessments interpreted with use of the color chart. The color chart could include information keyed to specified color intensities, such as "wear current aligner for another week and retest", or "use Chewies® (or something you bite on) every 4 hours to seat aligner better, retest in X number of days."

The patient, if self-monitoring, could also take a picture of the aligner in the mouth or, after they removed the aligner, send the photo to the treating doctor. Alternatively, are app for a smartphone would sample for the color and evaluate the color, or assess the color image over teledentistry apps, FaceTime®, Duo®, and the like.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings.

Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims, Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. A method of monitoring the degree of fit of an aligner among a series of aligners defining a corresponding series of tooth positions comprising:

selecting an aligner in the series of aligners whose fit to a patient's teeth are to be tested to determine its fit with the selected aligner;

disposing a nontoxic plastic material into the selected aligner, wherein the nontoxic plastic material is colored with an intensity of color being proportional to the thickness of the material;

setting the patient's teeth into the selected aligner containing the nontoxic plastic material; and determining the amount of material disposed onto the interior aligner's surfaces by visual inspection by assessment of the material disposed therein, a good fit being determined by a light color of the disposed material being extruded onto a plurality of the interior aligner surfaces, and a poor fit being determined by a dark color of the disposed material being extruded onto one or more locations of the aligner interior surfaces, where determining a good fit by a light color of the disposed material and determining a poor fit by a dark color of the disposed material comprises comparing observed color of the disposed material to a color chart to determine when the color is a light color indicative of a good fit or when the color is a dark color indicative of a poor fit and corresponding intensities of color therebetween corresponding to degrees of fit therebetween, and where comparing observed color of the disposed material to a color chart comprises making a visual comparison between the color of the disposed material and a printed color sample, or scanning the disposed material to create a scanned image and assessing the color of the scanned image using an in situ or remote computer.

2. The method of claim 1 where setting the patient's teeth into the selected aligner containing the nontoxic plastic material comprises improving the fit using cotton rolls or chewier.

3. The method of claim 1 further comprising:

selecting a next aligner higher in the series of aligners whose fit to a patient's teeth are to be tested to determine whether it is appropriate to progress to use of the next aligner in the series;

disposing a nontoxic plastic material into the selected next aligner, wherein the nontoxic plastic material is colored with an intensity of color being proportional to the thickness of the material;

setting the patient's teeth into the selected next aligner containing the nontoxic plastic material; and determining the amount of material disposed onto the interior next aligner's surfaces by visual inspection by assessment of the material disposed therein, a good fit being determined by a light color of the disposed material being extruded onto a plurality of the interior aligner surfaces, and a poor fit being determined by a dark color of the disposed material being extruded onto one or more locations of the next aligner interior surfaces.

4. The method of claim 3 further comprising comparing an assessment of fit between the selected aligner and selected next aligner to determine which is a better fit with the corresponding selected aligner and selected next aligner to determine appropriateness of progressing higher in the series of aligners.

5. The method of claim 4 where setting the patient's teeth into the selected aligner and selected next aligner containing the nontoxic plastic material comprises improving the fit using cotton rolls or chewies.

6. The method of claim 1 further comprising making a photograph or image of the lack of fit between the teeth and the selected aligner and where determining the amount of material disposed onto the interior aligner's surfaces by visual inspection by assessment of the material disposed therein, comprises assessing the photograph or image.

7. A method of monitoring the degree of fit of an aligner among a series of aligners defining a corresponding series of tooth positions comprising:

selecting an aligner in the series of aligners whose fit to a patient's teeth are to be tested to determine its fit with the selected aligner;

disposing a nontoxic colored plastic material into the selected aligner, wherein the nontoxic colored plastic material comprises an intensity of color that is proportional to the thickness of the material;

setting the patient's teeth into the selected aligner containing the nontoxic colored plastic material;

making an impression of the lack of fit between the teeth and the selected aligner; and determining the amount of material disposed onto the interior aligner's surfaces by visual inspection by assessment of the material disposed therein, a good fit being determined by a light color of the disposed material being extruded onto a plurality of the interior aligner surfaces, and a poor fit being determined by dark color of the disposed material being extruded onto one or more locations of the aligner interior surfaces, where determining the amount of material disposed onto the interior aligner's surfaces by visual inspection by assessment of the material disposed therein, comprises assessing a three dimensional shape of the impression, and where determining a good fit by a light color of the disposed material and determining a poor fit by a dark color of the disposed material comprises comparing observed color of the disposed material to a color chart to determine when the color is a light color indicative of a good fit or when the color is a dark color indicative of a poor fit and corresponding intensities of color therebetween corresponding to degrees of fit therebetween.

8. The method of claim 7 where setting the patient's teeth into the selected aligner containing the nontoxic plastic material comprises improving the fit using cotton rolls or chewier.

9. The method of claim 7 further comprising:

selecting a next aligner higher in the series of aligners whose fit to a patient's teeth are to be tested to determine whether it is appropriate to progress to use of the next aligner in the series;

disposing a nontoxic plastic material into the selected next aligner, wherein the nontoxic plastic material is colored with an intensity of color being proportional to the thickness of the material;

setting the patient's teeth into the selected next aligner containing the nontoxic plastic material; and determining the amount of material disposed onto the interior next aligner's surfaces by visual inspection by assessment of the material disposed therein, a good fit being determined by a light color of the disposed material being extruded onto a plurality of the interior aligner surfaces, and a poor fit being determined by a dark color of the disposed material being extruded onto one or more locations of the next aligner interior surfaces.

10. The method of claim 9 further comprising comparing an assessment of fit between the selected aligner and selected next aligner to determine which is a better fit with the corresponding selected aligner and selected next aligner to determine appropriateness of progressing higher in the series of aligners.

11. The method of claim 10 where setting the patient's teeth into the selected aligner and selected next aligner containing the nontoxic plastic material comprises improving the fit using cotton rolls or chewies.

* * * * *